Figure 4:
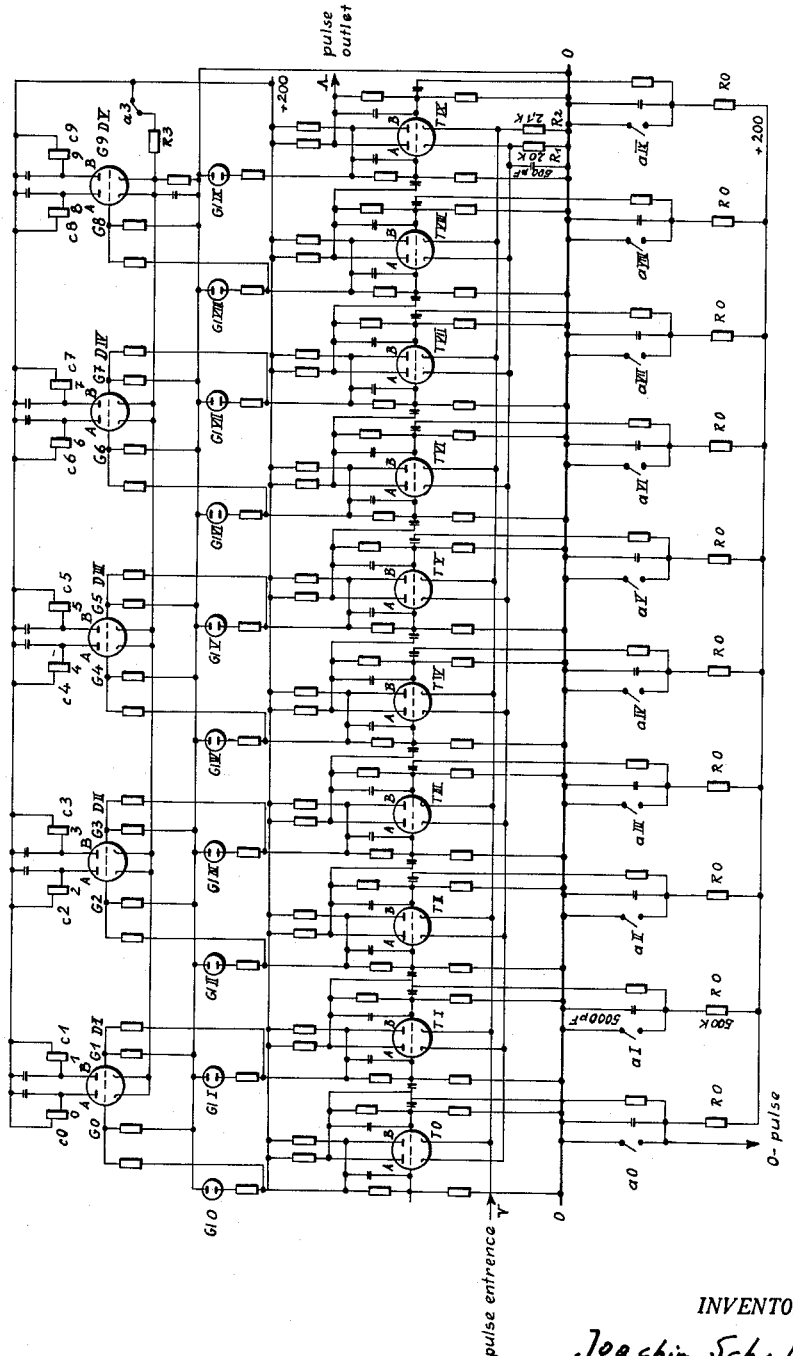

Dec. 12, 1961  J. SCHULZE  3,012,718
ARRANGEMENT FOR AUTOMATIC TRANSFER OF BALANCES
TO LEDGER CARDS IN BOOKKEEPING OPERATIONS
Filed July 3, 1957  5 Sheets-Sheet 1
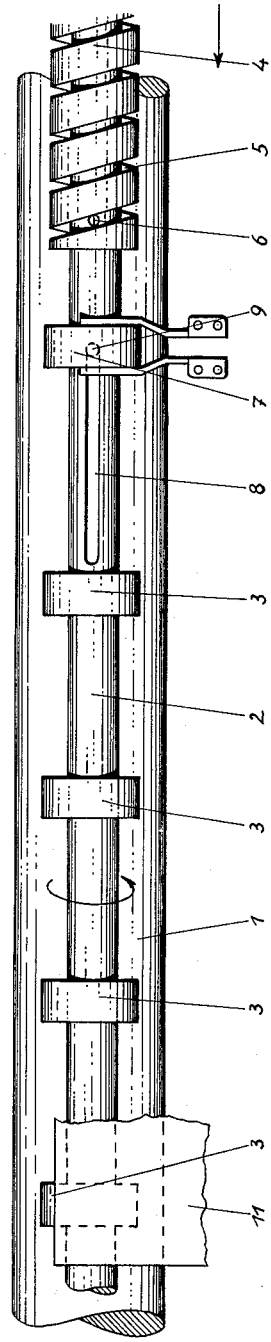
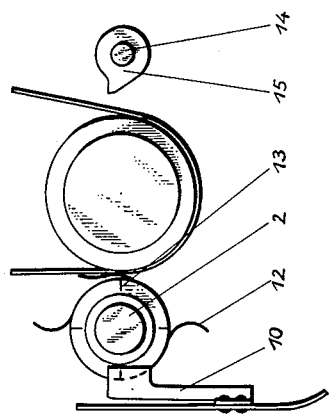
INVENTOR.
BY Joachim Schulze

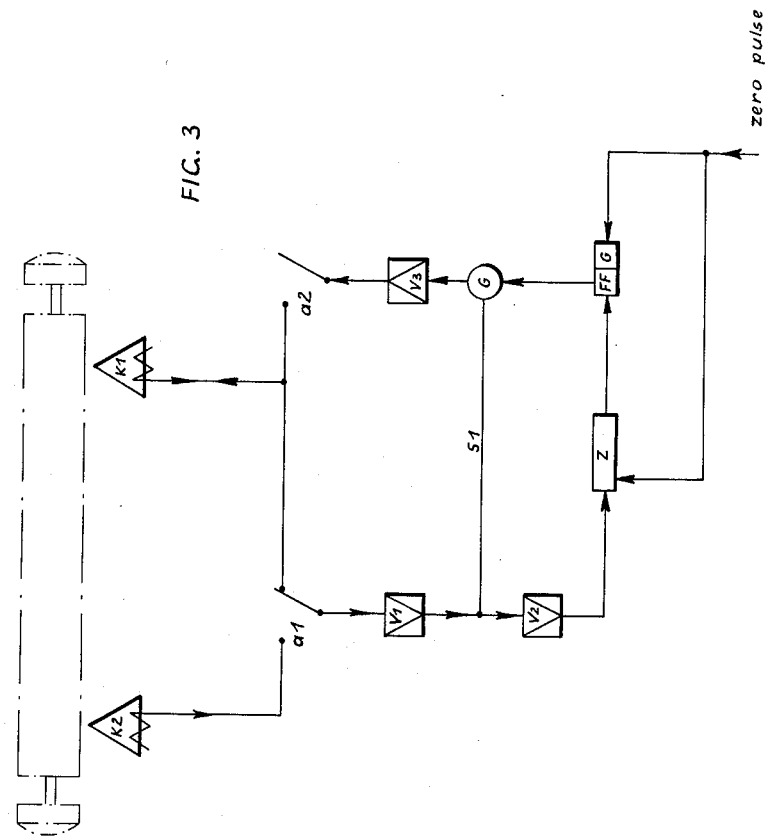

INVENTOR.
BY Joachim Schulze

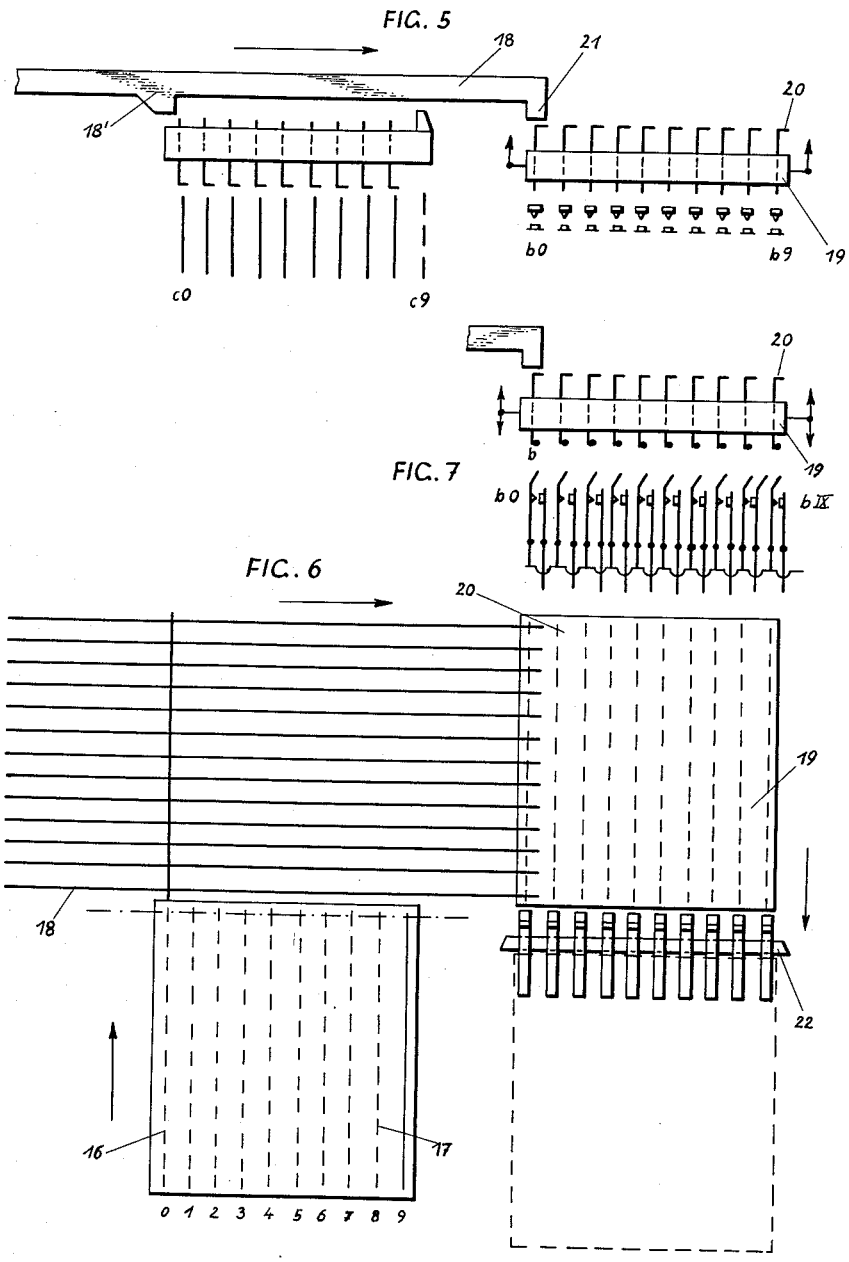

United States Patent Office 3,012,718
Patented Dec. 12, 1961

3,012,718
ARRANGEMENT FOR AUTOMATIC TRANSFER OF BALANCES TO LEDGER CARDS IN BOOK-KEEPING OPERATIONS
Joachim Schulze, Limbach-Oberfrohna, Germany, assignor to VEB Buchungsmaschinenwerk Karl-Marx-Stadt, Karl-Marx-Stadt, Germany
Filed July 3, 1957, Ser. No. 669,792
13 Claims. (Cl. 235—61.6)

This invention relates to an arrangement for the automatic transfer of balances to ledger cards during bookkeeping operations.

Arrangements for automatically carrying forward balances are known, and in one of them for example, after computation of the new balance, corresponding holes symbolizing the new balance are punched in the ledger card for storing the new balance. During continuation of the accounting work these perforations are felt out when the ledger card is introduced into the carriage of a bookkeeping machine, and the old balance is automatically transferred to a crossfooter, and after computation of the new balance the latter is punched in a fresh line of the ledger card and stored again. This arrangement, however, has the disadvantage that the provision of punching and checking means requires a considerable mechanical equipment and is therefore expensive. In addition, feeling-out of the punched symbols involves difficulties, since the ledger card has to be laterally guided with an accuracy up to half a millimeter.

Other known arrangements store figures in the form of impulses on a magnetic basis; they operate with magnetic drums or tapes and are firmly arranged in the machine. This arrangement is open to the objection that only a certain number of store values can be entered and the means for transferring the magnetic impulses are highly complicated and very expensive.

It is the object of the present invention to provide an arrangement which in contrast with the known electronic arrangements considerably restricts the amount of electronic switching elements in a manner which will be explained below and whereby the arrangement is simplified and its cost reduced. This is mainly achieved by providing for having lettering or feeling out of the ledger cards performed by one or more magnetic heads rotating on a shaft and carrying out a feeding motion along a magnetizable layer.

The ledger cards used by the invention are provided in known manner with a layer of magnetite corresponding to the number of digits, and the balances are stored thereon in the usual way in the form of magnetic pulses.

Contrary to known arrangements the ledger card is not felt out while it is introduced into the carriage of a machine but in stationary position. This is necessary because the electronic time has to be lengthened according to the reactivity of the mechanical intermediate members and on the other hand affords the advantage that in connection with the mechanical equipment the successive pulse sequences permit the use of only one electronic counter.

One embodiment of the invention is illustrated in the accompanying drawing, wherein FIGURE 1 shows the magnetic heads arranged on a shaft;

FIG. 2, the arrangement of FIG. 1 seen in the direction of the arrow;

FIG. 3, the basic principle of the electronic switching method;

FIG. 4, the electronic counter;

FIG. 5, a diagrammatic representation of the pin and contact member carrier and of the racks seen from the front;

FIG. 6, the arrangement of FIG. 5 seen from above;

FIG. 7, another form of the contact member carrier; and

Figure 8:
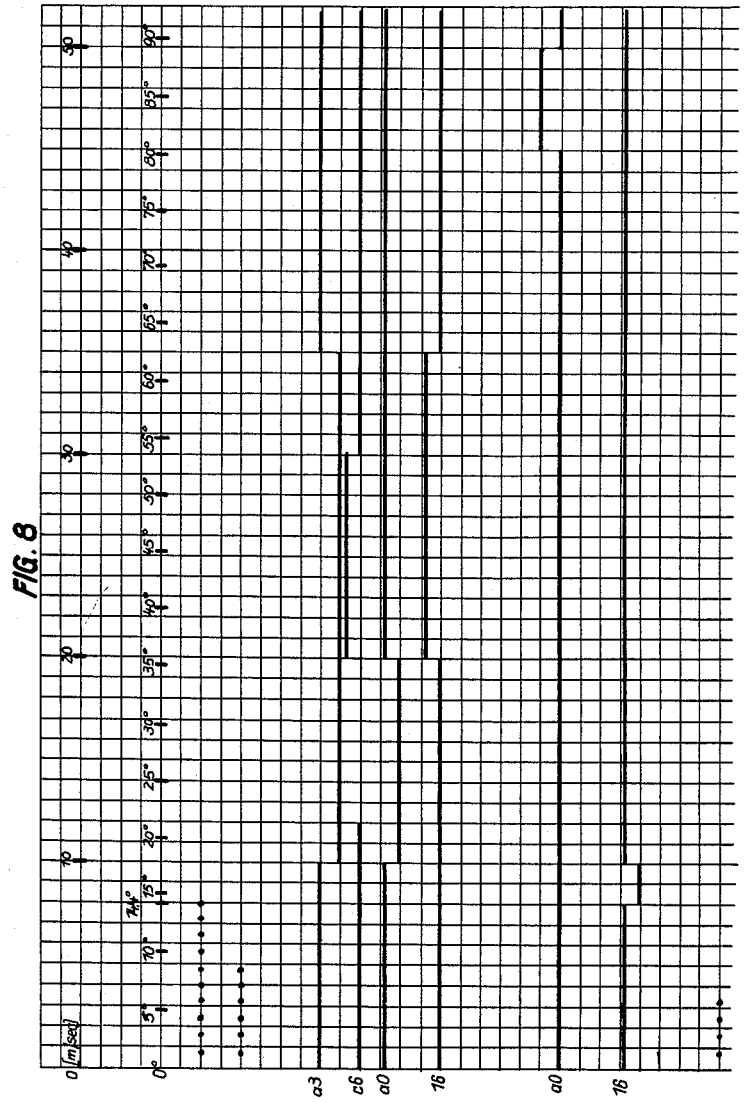

FIG. 8, a switching time diagram.

On the level of a recording roll 1 a shaft 2 arranged in known means not shown supports four firmly secured magnetic heads 3. On the right hand side of shaft 2 a hollow bar 4 possesses a spiral groove 5 in which a guide pin 6 secured to shaft 2 slides. The hollow bar 4 is firmly arranged, and shaft 2 is rotated by known driving means not shown as indicated in FIG. 1, shaft 2 moving with its guide pin 6 in the spiral groove 5 of hollow bar 4 to the right until each magnetic head 3 has passed over the space separating it from the next head so that each head 3 carries out a certain number of revolutions proportionate to the number of digits to be worked and that of the operating heads 3. The recording gaps of the heads 3 are staggered 90°, and only one head is always in active position. On shaft 2 a magnetic head 7 is provided in such manner that it does not cooperate in the motion of shaft 2 in horizontal direction, but follows the rotations thereof. For this purpose shaft 2 is fitted with a longitudinal groove 8 in which a nose 9 of the magnetic head 7 moves which is limited on both sides by a stationary two-part guide member 10 so that head 7 participates in the rotation of the shaft but not in its lateral displacement. The magnetic head 7 operates in known manner as synchronizing head.

In front of the entire arrangement an insulated metal sheet 11 extends over the range of motion of magnetic heads 3. On these heads as well as on head 7 contact springs 12 are provided which during rotation slide on sheet 11 a certain time so that when a recording gap 13 slides past a ledger card contact is made. As zero potential serves shaft 2.

At a suitable point a camshaft 14 rotates parallel with shaft 2, and its cam 15 closes and opens various switching contacts, as will be explained later on.

The wiring scheme of FIG. 3 shows the course of pulses up to their delivery to the mechanical intermediate members. The number of magnetic heads used is immaterial with respect to the switching principle and is reduced in this wiring diagram to a pickup and reproducing head K1 and a synchronizing head K2.

Assumed a ledger card is in position for feeling-out, i.e. head K1 becomes active. During feeling-out a make-and-break contact $a1$ is in operating position relative to head K1 which picks up the pulses lying between "0" and "10" when the decimal system is applied and passing over known amplifiers V1 and V2 into an electronic counter Z for storage. Over a lead S1 the pulses also pass to a gate G but remain ineffective, since this gate is still closed and contact $a2$ opened. Through counter Z whose action will be described in greater detail relays are actuated according to the number of pulses felt out and thereby the pulses transmitted to the mechanical parts of the machine. After each digit has been felt out, counter Z is set to zero again by a zero pulse. In this way the value of the balance is entered digit for digit in the machine, and the new balance computed in the machine is likewise entered over the mechanical intermediate members in counter Z as will be described.

During this operation of recording the new balance the working contact $a1$ is in operative position relative to synchronizing head K2. While in this position this head periodically issues decadic sequences of pulses which, however, do not affect the arrangement during feeling out owing to the counteraction of contact $a1$.

A contact $a2$ is in active position relative to head K1 during recording. Assume a value "8" in counter Z is to be transferred to a ledger card. As soon as head K2 is in its effective position its action as synchronizing head begins by giving off ten pulses over closed contact $a1$ and amplifiers V1, V2 to counter Z which is filled up to value "10" and as it contains already value "8" takes up only two pulses. With the second or tenth pulse the counter issues a pulse to flip-flop FF which is switched thereby and opens gate G. The other eight pulses given off by synchronizing head K2 then pass over gate G, an amplifier V3 and closed contact $a2$ to the writing head K1.

After completion of this operation flip-flop FF is switched by a zero pulse and thereby gate G closed. Counter Z also receives this pulse and is thereby set to "zero" for the next following value. FIG. 4 shows the system of connections of the electronic counter Z.

The essential switching elements of counter Z are ten triggers with double triodes T0–TIX. The two tube systems for each trigger are marked A and B. From the anodes of tube systems B leads pass to grids G0–G9 of double triodes DI–DV in the anode leads of which relays C0–CIX are interposed. The cathode lead of double triodes DI–DV is connected with the plus potential by an operating contact $a3$ over a resistance R3. Contact $a3$ is actuated by cam 15 on shaft 14 and opened once during each operating cycle of counter Z, that is to say after the number of pulses corresponding to the value to be felt out has entered counter Z over head K1 to actuate one of the relays C0–C9 according to the position of the counter.

The cathode resistances R1 and R2 of the double triodes T0–TIX are so dimensioned that only one system A at a time, and in resting position of the counter the tube system A of the first tube T0, is in current-carrying condition. The values handled by the magnetic heads pass as negative pulses to the cathode leads of tube systems B of double triodes T0–TIX. In zero position of counter Z system A of double triode T0 carries the current as stated. Because system B of this tube does not carry current, the voltage potential is high and a gaseous conduction lamp G$l0$ gives light.

Assumed value "6" is being felt out and six pulses enter the counter. By the first pulse arriving the cathode of system B of tube T0 becomes negative and thus the grid opposite the cathode potential positive so that, by switching, system B becomes alive. The resulting voltage increase at the anode of tube system A has a positive effect upon the grid of tube system A of the double triode TI, and its system A carries current. The increasing voltage potential at the anode of tube system B of this double triode TI causes the gaseous conduction lamp G$II$ to light up.

The second pulse arriving switches the double triode TI from system B to system A as in the first case, whereby a positive effect is given again to the grid of system A of double triode TII and lamp G$III$ lights up. In this way the counter is switched through according to the number of pulses, and when the sixth pulse has been entered for the assumed value "6," system A of double triode TVI carries current and lamp G$IVI$ lights up.

The voltage increase at tube system B of double triode VI acts positively upon grid G4 of the tube system A of double triode DIV. To prevent, however, the double triodes DI–V from becoming alive and the relays C0–9 from being energized at each passage of a pulse through one of the double triodes T0–TIX, the cathode potential of double triodes DI–V is held up by contact $a3$ so that current flow is not possible. After the time interval required for ten pulses to enter counter Z contact $a3$ is opened by cam 15. In consequence thereof the voltage potential at the cathodes of double triodes DI–V is more negative, and only the tube system A of double triode DIV, grid-controlled by double triode DVI in this instance and containing the final pulse values, will carry current. This current flow energizes relay C6 and pulls it up. All relays C0–C9 act on a pin carriage by means of which the values are transmitted to the machine. Counter Z is then cancelled by a zero pulse released by cam 15 to be ready for the following value.

When the new balance is entered on a ledger card, the computed digital values are not entered in the counter by successive pulses but by means of a contact member carrier which, corresponding to the digital value, places one of the contacts 0–IX assigned to each counting point of counter Z in active position and thereby instantly switches the counter to the corresponding value. For example, if value "6" were entered again, contact $a$VI appertaining to counting point six or to double triode TVI would be closed. Grid G of tube system B of this double triode will thereby become negative and system A alive. The voltage potential appearing at the anode of system B causes lamp G$IVI$ to light up and the same condition prevails as if the corresponding six pulses had been entered.

The action of the synchronizing head begins after a fixed time by issuing ten pulses four of which enter counter Z and connect it through to the last counting point. With the fourth pulse the counter is filled, and the positive pulse issued by system A of double triode TIX leaves it as described for switching the flip-flop FF.

Cancelling of the counter and switching of flip-flop FF is performed again by cam 15 while contact $a0$ is closed, whereby the grid of system B of the double triode becomes negative and system A alive. The counter is then in zero position again.

As stated before, through the electronic counter Z the relays C0–C9 appertaining to the respective digital values are caused to be pulled up. FIG. 5 is diagrammatic representation of these relays. If the value "6" had been entered in counter Z by pulses, as assumed in the preceding example, relay C6 would be pulled up after the opening of contact $a3$. By known means the pin for value "6" in the first row of a known pin carriage 16 possessing pins 17 is then brought into active position. While the switching operation described is taking place the pin carriage 16 advances one step in the direction of the arrow so that at pulling up of a relay C0–C9 of the corresponding subsequent pulse value the respective pin 17 in the second row can be placed in operative position. This process is repeated until all values on the pin carriage 16 are in position and the carriage has been moved as many steps in the direction of the arrow as correspond to the number of digital values entered and is thus placed above the racks 18. During the following cycle of the bookkeeping machine the racks 18 are moved in the direction of the arrow and knock with noses 18' against the set pins 17 while simultaneously the value is entered in known manner in a corresponding crossfooter of the machine. After this operation the pin carriage 16 is returned to initial position.

During recording of the new balance a contact member carrier 19 positioned in the direction of motion of the racks 18 and possessing the same number of contact members 20 as the pin carriage 16 has pins becomes effective. When the new balance is computed, the racks 18 are set according to the values by the corresponding crossfooter and pass with projections 21 of their rear ends into a corresponding position relative to the contact members 20. The contact member carrier 19 is then moved up as indicated in FIG. 5 and one contact member placed in active position by each rack 18. The carrier 19 is then felt out, and by closing one contact $b0$–$b9$ after another the values are entered in counter Z which moves step by step in the direction of the arrow as shown in FIG. 5. After feeling-out the pins 20 are placed in resting position by a known cancelling means 22, and when all places have been felt out, the contact member carrier 19 is returned to initial position.

FIG. 7 shows another design of the contact member carrier 19.

As in the first example of construction the corresponding contact members 20 are set by the projections 21 of the racks 18 by lifting the carrier 19, and the contact members are serially connected in parallel and joined to a step relay, not shown. The carrier 19 containing a number of contacts equal to that of the pins 17 of the pin carriage 16 is moved up, the number of contacts being 10×13, and the corresponding contact members 20 are brought into active position by the racks 18. The carrier 19 is thereupon moved down beyond its initial position, whereby contacts $b0-bIX$ are closed, felt out by the step relay and always one contact $a0-aIX$ after another corresponding to value is closed and thus entered in counter Z. The diagram in FIG. 8 shows the switching times of the most important operating cycles.

This diagram refers to the example assumed when four pickup and reproducing heads are used, though the number of heads is not restricted to this figure, and the time values assumed in this example may also vary.

The diagram covers one fourth of an operating phase, i.e. of one full rotation of shaft 2. As the active positions of the heads are staggered 90° relative to one another, the operating phase is divided into four sections to each of which an angle of rotation of shaft 2 of 90° is due and a total of four places is worked.

The time for feeling out ten possible pulses amounts to 8 milliseconds as shown.

It is assumed again that the value of six pulses is entered in the counter.

After ten milliseconds the contact $a3$ shown in FIG. 4 is opened by cam 15 and relay C6 is energized as described. The time for energization and pulling up covers 10 to 20 msec. During this time the pin carriage 16 must be at rest to permit setting of the respective pin 17 as stated. After 20 msec. the zero contact $a0$ is closed already by cam 15 and the flow of current to relay C6 interrupted. At the same time begins also the gradual movement of the pin carriage 16 to the next place. After ten msec. more, i.e. after a total of 30 msec., the energized relay C6 releases and is resting again. On the lower half of the diagram recording is shown, the direction of rotation of the magnetic heads being in this case as stated opposite to that of feeling out.

I claim:

1. In a bookkeeping machine, an arrangement for sensing from and recording upon a ledger card having a magnetic layer, comprising a rotatable shaft, magnetic means rotating on said shaft for movement along the magnetic layer, said magnetic means sensing each card and recording bookkeeping balances thereon in the form of magnetic pulses, an electronic counter, transfer means for entering the pulses sensed by said magnetic means into said counter, a plurality of relays corresponding to the respective values of the counter connected to said counter so as to be actuated by the operation of said counter in response to a value in said counter, a pin carriage having a plurality of pins corresponding to respective values for placing the pins in operative position, contact member means responsive to the position of pins on said pin carriage for entering the value in said counter as indicated by said pins into the bookkeeping machine and for transmitting the balances in the bookkeeping machine into the counter, and switching means actuated by said counter for causing the transmission of the values indicated in said counter to said magnetic means.

2. Arrangement according to claim 1, in which the shaft supporting the magnetic means moves with a guide pin in a hollow bar having a spiral groove and an additional magnetic means serving as a synchronizing member remains in its horizontal position owing to the movement of the shaft with its groove on a nose of said member which follows only the rotary motion of said shaft.

3. A device as in claim 2, wherein during transfer of balances to a ledger card said counter is filled to saturation by the action of said synchronizing member and emits a pulse, and wherein said switching means include a flip-flop which is switched by the pulse from the saturated counter, and a gate opened by said flip-flop and connected to said magnetic means for transferring the remaining pulses to said magnetic means whereby the complementary value for the number of pulses required for filling the counter is transferred from the synchronizing member to the magnetic means, said synchronizing member emitting a number of pulses equal to the number of places in said counter.

4. Arrangement according to claim 2, in which the magnetic means are provided with contact springs making contact in operative position of said heads.

5. Arrangement according to claim 4, in which a cam of a camshaft rotating parallel with the shaft supporting magnetic means periodically opens and closes contacts.

6. Arrangement according to claim 1, in which the electronic counter includes ten counting places in the form of double triodes whose cathode resistances are such that only one of the ten double triodes is in operating position and at input of pulses these counting places are successively connected through and a glow lamp for each of said triodes, said glow lamps being responsive to said triodes.

7. Arrangement according to claim 6, in which to the double triodes representing the ten counting places five grid-controlled double triodes are connected, said plurality of relays each being associated with one of said double triodes and connected to one of said triodes whereby at current flow in one of said grid control double triodes the relay associated therewith is energized and at current flow a relay associated with each tube system is energized.

8. Arrangement according to claim 7, further comprising means whereby after input of all pulses in the counter a contact is opened by the cam whereby a potential difference is caused in the double triodes and in consequence thereof the tube system grid-controlled from the corresponding counting place carries current and only the relay appertaining to the double triode containing the final value is pulled up.

9. Arrangement according to claim 8, further comprising means whereby the transfer of balances to a ledger card contacts are closed by a contact member means and thereby the double triode representing the corresponding counting point is placed in operative position.

10. Arrangement according to claim 6, further comprising means whereby the counter is cancelled by a zero pulse given by the cam of the camshaft.

11. An arrangement as in claim 1 further comprising of plurality of racks responsive to the position of said pins for setting said contact member means whereby after setting of the relays by racks the value is taken from the pin carriage means whereby after computation of the new balance the racks are set by a corresponding crossfooter and thereby placed with their projections in position to contact members contained in the contact member carrier which is lifted and means whereby one contact member each is brought into operative position by the projections of the racks, the contact member carrier moving in steps and closing contacts transmitting the value concerned to the counter.

12. Arrangement according to claim 11, in which the contact member carrier contains the same number of contacts as the pin carriage has pins, said contacts are serially connected in parallel and after setting of said contact members by the lifting of their carrier are closed by lowering it, successively felt out by a step relay and the values concerned entered in the counter.

13. In bookkeeping machines, an apparatus for sensing bookkeeping ledger cards having magnetic surfaces and for recording balance values on said ledger cards, comprising a stationary hollow bar forming a spiral groove, a rotatable and axially movable shaft mounted near a card to be sensed and extending into the hollow bar, a guide pin radially projecting from said shaft and extending into the spiral groove for axial movement of said shaft upon rotation thereof, magnetic means secured to said shaft and movable by said shaft along the cards for sensing of the cards and for producing pulses in response to digits recorded on the cards and for transferring balances into the magnetic surface of the card upon receiving pulses, electronic means connected to said magnetic means for responding to the pulses from said magnetic means when said magnetic means senses a card; said electronic means comprising a counter including a plurality of flip-flops, glow lamps responsive to said flip-flops for indicating the number of pulses fed into the counter, a triode connected with each of said flip-flops and responsive to the conductive condition of said flip-flops, a plurality of electromagnets each connected to each of said triodes and energizeable by the said triodes so as to indicate the number which has been counted by the counter; a plurality of contact members, a plurality of electrical bookkeeping contacts for actuation by said contact members, a plurality of contact member controlling tooth racks cooperating with said contact members, a plurality of pins, a movable pin carrier for cooperation with said racks for controlling a different rack for each digit, said pins being selectively lifted by operation of said relays, a contact member support for holding said contact members and for lifting said contact members toward said racks so as to set the contact members and for lowering the contact members so as to actuate said contacts, said contacts being connectable to said flip-flops whereby current is supplied to the triodes upon said contacts being closed and current being conveyed to one of the flip-flops of the counter, switch over means for switching from a sensing position to a recording position, said switch over means being effective to connect the input of said counter to said magnetic means, synchronizing means mounted on said shaft for emitting a number of pulses equal to the number of flip-flops in said counter, said switch over means being alternately effective to connect the input of said counter to said synchronizing means and to connect said flip-flops to said contacts, a gate connected between said synchronizing means and said magnetic means upon said switch over means being set to record, a bi-stable multi-vibrator responsive to saturation of said counter for opening said gate, whereby upon said switch over means being set to record and said flip-flops being actuated by said contacts so as to record a balance, the pulses from said synchronizing means saturate said counter and cause opening of said gate while the remainder of said pulses from said synchronizing means pass to said magnetic means, whereby a new balance is automatically and magnetically entered on the ledger card.

References Cited in the file of this patent
UNITED STATES PATENTS 2,357,455    Bryce ---------------- Sept. 5, 1944

UNITED STATES PATENT OFFICE
CERTIFICATE OF CORRECTION

Patent No. 3,012,718  December 12, 1961

Joachim Schulze

It is hereby certified that error appears in the above numbered patent requiring correction and that the said Letters Patent should read as corrected below.

Column 6, line 51, for "of", first occurrence, read -- a --.

Signed and sealed this 24th day of April 1962.

(SEAL)
Attest:

ESTON G. JOHNSON
Attesting Officer

DAVID L. LADD
Commissioner of Patents